United States Patent [19]

Colonel

[11] 3,845,330

[45] Oct. 29, 1974

[54] BISTABLE ELECTRONIC CIRCUIT

[75] Inventor: Celio Trinca Colonel, Bregnano, Italy

[73] Assignee: Honeywell Information Systems Italia, Caluso, Italy

[22] Filed: Sept. 11, 1972

[21] Appl. No.: 288,191

Related U.S. Application Data

[63] Continuation of Ser. No. 139,334, May 3, 1971, abandoned.

[52] U.S. Cl. .................. 307/289, 307/215, 307/291

[51] Int. Cl. .......................................... H03k 3/286

[58] Field of Search ..................... 307/215, 289, 291

[56] References Cited

UNITED STATES PATENTS 3,454,935 7/1969 Hippisley, Jr. .................. 307/289 X

*Primary Examiner*—John Zazworsky
*Attorney, Agent, or Firm*—Fred Jacob

[57] ABSTRACT

A flip-flop having a rapid response time, wherein delays in response to changes in input signals and propagation time therethrough are minimized by circuit configurations which minimize logical inversion functions.

12 Claims, 8 Drawing Figures

Celio TRINCA COLONEL
INVENTOR.

By [signature]
ATTORNEY.

Celio TRINCA COLONEL
INVENTOR.

By [signature]
ATTORNEY.

Celio TRINCA COLONEL
INVENTOR.

By [signature]
ATTORNEY.

PATENTED OCT 29 1974 3,845,330

SHEET 4 OF 4

Celio TRINCA COLONEL
INVENTOR.

By [signature]
ATTORNEY.

BISTABLE ELECTRONIC CIRCUIT

This is a continuation, of application Ser. No. 139,334, filed May 3, 1971 and now abandoned.

BACKGROUND OF THE INVENTION

The present invention relates to a bistable electronic circuit of the "flip-flop-latch" type.

A "flip-flop-latch" is a bistable circuit for receiving at an input terminal thereof binary information in the form of one of two distinct electrical levels, and for storing a representation of such information, by assuming one of two distinct stable states, upon the application of a suitable enabling "clock" pulse to another input terminal thereof. In absence of a clock pulse the state of the latch does not change, even though the input information level changes. Usually a special presetting input terminal also is provided for initially setting the latch to a predetermined state, independant of the state of the information input.

Various types of flip-flop-latches are known in the art, differing according to the components and technologies employed. These bistable circuits are used extensively for forming complex logical networks, as in the instance of electronic data processors which usually demand a high operating speed of the circuits.

The operating speed of a flip-flop-latch depends both on the technology employed and on the circuits configuration of the latch. One form of technology successfully employed for high-speed integrated circuits is called TTL (Transistor-Transistor-Logic), which will be more specifically referred to in the ensuing description.

Accordingly, it is the object of the instant invention to provide an improved flip-flop-latch circuit having a high operating speed.

The flip-flop-latch circuit of the instant invention consists of a relatively simple logical configuration, thereby requiring fewer components. Moreover, the invention is adapted for implementation by discrete components, as well as by integrated circuit technology, particularly TTL technology.

BRIEF DESCRIPTION OF THE DRAWING

The invention will be described with reference to the accompanying drawing, wherein:

FIG. 2 is a logical diagram of a first embodiment of the bistable circuit of the invention;

LATCH CHARACTERISTICS

Before describing the improved bistable circuit of the invention, some general considerations of this type of circuit will be first set forth.

Generaly, a flip-flop-latch is a logical device characterized by a clock input terminal C, a data input terminal D, a direct output terminal Q and a complementary output terminal $\overline{Q}$, or at least one such output terminal. The signals applied to the input terminals and delivered the output terminals are binary signals, i.e., they subsist at one of two distinct electrical levels associated respectively with the binary values "1" and "0."

Figure 1A:
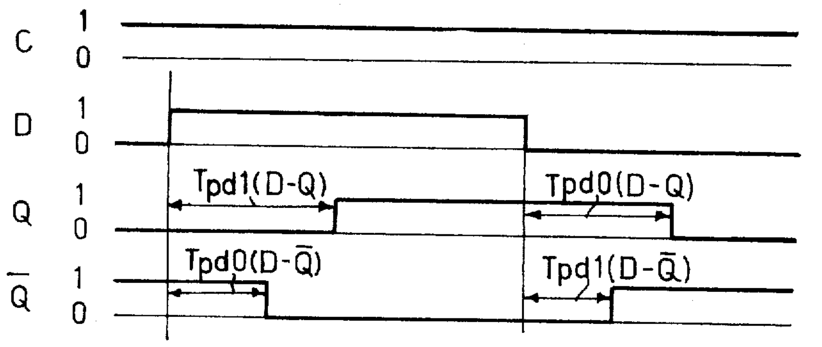
FIGS. 1*a* and 1*b* are timing diagrams illustrating the different parameters defining the speed performance of a bistable circuit.

The following parameters, defined for purposes of the present disclosure, are shown in the timing diagrams of FIG. 1*A*:

Tpd 1 (D-$\overline{Q}$) is the time required for a change of the input signal from the binary level "0" to the binary level "1" (a positive going pulse front) to propagate from data input terminal D to direct output terminal $\overline{Q}$, where it is delivered as a positive-going pulse front.

Tpd O (D-$\overline{Q}$) is the time required for a change of the input signal from the binary level "1" to the binary level "0" (a negative-going pulse front) to propagate from input terminal D to output terminal Q, where it is delivered as a negative-going pulse front.

Tpd O (D-$\overline{Q}$) is the time required for a change of the input signal from the binary level "0" to the binary level "1" (a positive-going pulse front) to propagate from input terminal D to output terminal $\overline{Q}$, where it is delivered as a negative-going pulse front.

Tpd 1 (D-$\overline{Q}$) is the time required for a change of the input signal from the binary level "1" to the binary level "0" (a negative-going pulse front) to propagate from input terminal D to output terminal $\overline{Q}$, where it is delivered as a positive-going pulse front.

The propagation delays corresponding to the above-defined parameters are measured by applying a steady binary level "1" signal to clock input terminal C thereby permanently enabling the input data.

Figure 1B:
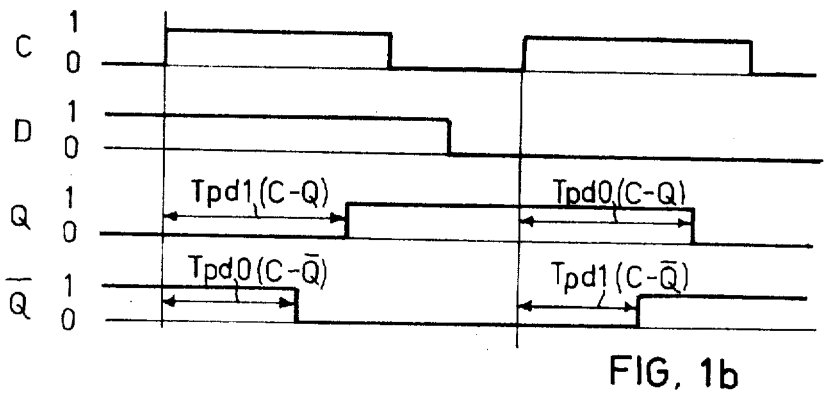

The delays corresponding to the following-defined parameters are measured by applying first a steady binary level "1" signal, and then a steady binary level "0" signal, to the data input terminal, and, during the application of each such signal, applying a clock signal to the clock input terminal. The information applied to the data input terminal is delivered at the output terminals after certain delays following the application of the clock signal. These delays FIGS. 1B, are defined as follows:

Tpd 1 (C-$\overline{Q}$) is the delay following application of a clock signal when a binary level "1" is being applied to the data input terminal for a positive-going pulse front to be delivered at output terminal Q.

Tpd 0 (C-$\overline{Q}$) is the delay following application of a clock signal when a binary level "0" is being applied to the data input terminal for a negative-going pulse front to be delivered at output terminal Q.

Tpd 0 (C-$\overline{Q}$) is the delay following application of a clock signal when a binary level "1" is being applied to the data input terminal for a negative-going pulse front to be delivered at output terminal $\overline{Q}$.

Tpd 1 (C-$\overline{Q}$) is the delay following application of a clock signal when a binary level "0" is being applied to the data input terminal for a positive-going pulse front to be delivered at output terminal $\overline{Q}$.

In most of the technologies employed for such circuitry whether or not they be integrated circuit technology; i.e., DTL (Diode-Transistor-Logic), RTL (Resistor-Transistor-Logic), or TTL (Transistor-Transistor-Logic), the significant delays are introduced only by those circuit elements which perform a logical inversion of the input signal, which include NOR gates, NAND gates, and inverters. Therefore, for these technologies, the transfer or propagation speed may be optimized through adopting a suitable logical configuration by assuming, to a first approximation, that non-inverting logical elements such as AND gates and OR gates do not introduce delays and that each elementary inverting circuit introduces a like delay, designated as $\Delta$.

DESCRIPTION OF THE PREFERRED EMBODIMENT

Figure 2:
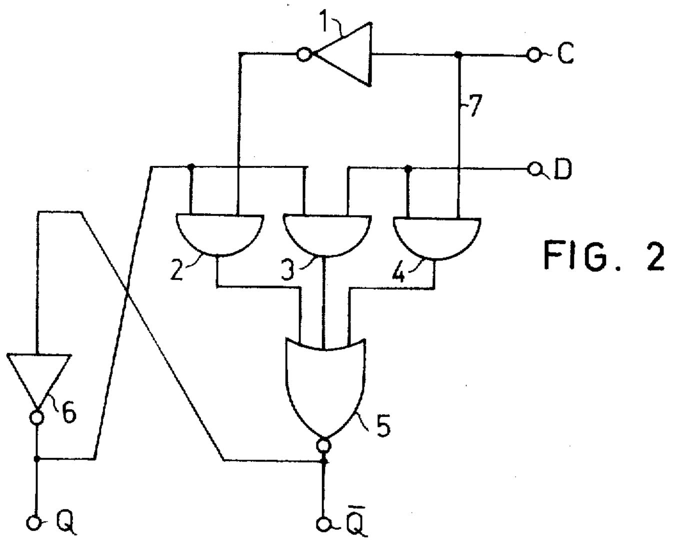
FIG. 2 is a logical diagram of a first embodiment of the bistable circuit

The embodiment of the circuit shown by the logical diagram of FIG. 2 comprises a first inverter 1, two-input AND gate 2, 3, and 4, a three input NOR gate 5, and a second inverter 6. The data input terminal D is connected to a first input terminal of each of AND gates 3 and 4. The clock input terminal C is connected by a lead 7 to the second input terminal of AND gate 4 and through inverter 1 to a first input terminal of AND gate 2. The second input terminal of AND gates 2 and 3 are connected to the output terminal of inverter 6. The output terminals of AND gates 2, 3, and 4 are connected to respective input terminals of NOR gate 5, whose output terminal is connected directly to the complementary output terminal $\overline{Q}$ and through inverter 6 to the direct output terminal Q.

The operation of the circuit will now be described in the quiescent condition a binary level "0" signal is applied to input terminal C, and the circuit operating in either of the two stable states. Accordingly, other terminals Q and $\overline{Q}$ deliver either respective binary "1" and "0" signals, or respective binary "0" and "1" signals.

Thus, when a binary "0" signal is applied to input terminal C, AND gate 4 is disabled, and its output is a binary "0" signal, whereas AND gate 2 is enabled and its output signal has the same binary value as the signal on its second input terminal, i.e., the direct output signal Q of the flip-flop. If the binary value of this direct output signal is "0," AND gates 2 and 3 are disabled regardless of the binary value of the D input signal. In this instance all three input signals to NOR gate 5 are binary "0's" so that the output signal of NOR gate 5, which is the $\overline{Q}$ output signal, is a binary "1." This binary signal is applied to inverter 6 and maintains output signal Q as a binary "0," and in turn is maintained as a binary "1" thereby.

If, however, the binary value of output signal Q is "1" when input signal C is a binary "0," AND gate 2 receives two binary "1" input signals and its output signal is a binary "1." Therefore, since one input signal to NOR gate 5 is a binary "1," its output signal is a binary "0." This $\overline{Q}$ signal is applied to inverter 6 and maintains the binary "1" value of ouput signal Q, and in turn, is maintained as a binary "0" thereby.

Accordingly, in the quiescent condition, when the clock signal C is a binary "0," the flip-flop operates in a stable state, maintaining this state irrespective of the value of the data input signal D.

Assume now that a binary level "1" signal is applied to input terminal D and a binary "1" clock signal is applied to terminal C. The output signal of AND gate 4 is a binary "1," so that the output signal of NOR gate 5 is a binary "0," independent of the other input signals from AND gates 2 and 3. The binary "0" output signal NOR gate 5 applied to inverter 6 maintains output signal Q at the binary "1" value, which, being applied to the second input terminal of AND gate 3, whose first input terminal is also at the binary "1" level, delivers a binary "1" signal to a second input terminal of NOR gate 5. Thus this state is maintained, not changing after the clock signal is terminated.

Immediately after the clock signal is terminated the output signal of inverter 1 becomes a binary "1" and enables AND gate 2, whose output signal becomes a binary "1." From this moment the data signal may be changed without affecting the state of the flip-flop, since a binary "1" signal continues to be applied to an input terminal of NOR gate 5.

Similarly, if input terminal D is at the binary "0" level and clock input terminal C is at the binary "1" level, all of AND gates 2, 3, and 4 are disabled and their output signals are binary "0's." Therefore, the output signal of NOR gate 5 is a binary "1," controlling the output signal of inverter 6 to be a binary "0." This state is maintained after the clock signal is terminated.

The preceeding explanation is related to this static or steady-state operation of the circuit. The dynamic aspects of the operation now will be considered. Thus, the different propagation times and delays, defined above will be taken into account under the assumption that the AND gates cause no delays and that each inverter and NOR gate introduces a delay $\Delta$.

These considerations will be facilitated by the use of Boolean equations describing the successive states of the circuit. Boolean algebra, as a means for the analysis of logical and sequential networks is now extensively used, and its elementary rules are widely known.

For FIG. 2, the binary values of the signals at clock input terminal C, data input terminal D, direct output terminal Q and complementary output terminal $\overline{Q}$ will be denoted hereinafter by the letter designations of the corresponding terminal. The subscript "*o*" will be employed to indicate the values of the output signals at anytime $t_o$, and the subscript 1 will be employed to indicate the values that these output signals will assume at a time $t_1$ which follows time $t_o$.

An equation representing the operation of the circuit of FIG. 2 and the binary value of the complementary output signal $\overline{Q}$ is $$\overline{Q}_1 = \overline{D\,C + D\,Q_o + \overline{C}\,Q_o} \qquad (1).$$

In absence of a clock pulse, C is O, so that:

$$\overline{Q}_1 = \overline{D\,Q_o + Q_o} = \overline{Q}_o$$

Thus, the circuit is in a stable state maintaining at time $t_1$ the state it was in at time $t_o$, regardless of the value of input signal D.

Consider, now, the operation of the circuit under the various conditions illustrated by FIG. 1*a*, wherein C is maintained as a 1. From equation (1):

$$\overline{Q}_1 = \overline{D + D\,Q_o} = \overline{D}$$

Thus the value of the complementary output signal $\overline{Q}$ is the binary inverse of the value of the input signal D. From an inspection of FIG. 2, it is seen that the path from terminal D to terminal $\overline{Q}$ comprises only one inverting element (NOR gate 5). Accordingly the delay with which the signal $\overline{Q}$ follows changes in the value of signal D is Δ.

Hence:

$$\text{Tpd } 1\ (D\text{-}\overline{Q}) = \Delta, \text{ and}$$

$$\text{Tpd } 0\ (D\text{-}\overline{Q}) = \Delta$$

Since the signal Q assumes its final value through inverter 6, which introduces a delay Δ with respect to the signal $\overline{Q}$, it follows that $$\text{Tpd } 0\ (D\text{-}Q) = 2\ \Delta$$

$$\text{Tpd } 1\ (D\text{-}Q) = 2\ \Delta$$

Consider, next, the equation of the circuit under the various conditions illustrated by FIG. 1*b*, wherein a clock signal C is received by terminal C during the application to terminal D of either a steady binary "0" signal or a steady binary "1" signal.

Where D = 0, equation (1) provides:

$$\overline{Q}_1 = \overline{\overline{C}\,Q_0} = C + \overline{Q}_0$$

which means that if $\overline{Q}_0$ is already equal to 1, $\overline{Q}_1$ does not change, but if $\overline{Q}_0$ is equal to 0, then $\overline{Q}_1 = C$. From an inspection of FIG. 2, it is seen that the signal $\overline{Q}_1$ follows the value of signal C after a double binary inversion (inverter 1 and NOR gate 5).

Accordingly:

$$\text{Tpd } 1\ (C\text{-}\overline{Q}) = 2\ \Delta, \text{ and}$$

$$\text{Tpd } 0\ (C\text{-}Q) = 3\ \Delta$$

Where D = 1, equation (1) provides:

$$\overline{Q}_1 = \overline{C + Q_0 + \overline{C}\,Q_0} = \overline{C + Q_0} = \overline{C} \cdot \overline{Q}_0$$

which means that if $\overline{Q}_0$ is already equal to 0, $\overline{Q}_1$ does not change, but if $\overline{Q}_0$ is equal to 1, $\overline{Q}_1 = \overline{C}$. In this instance the signal $\overline{Q}_1$ follows the inverted valve of signal C through a single inverting element (NOR gate 5). Accordingly:

$$\text{Tpd } 0\ (C\text{-}\overline{Q}) = \Delta, \text{ and}$$

$$\text{Tpd } 1\ (C\text{-}Q) = 2\ \Delta$$

In summary, with the clock terminal enabled, the propagation time of an information signal from terminal D to terminal $\overline{Q}$ is always Δ and from terminal D to terminal Q is always 2 Δ, but upon application of a clock signal the maximum propagation time from terminal C to terminal $\overline{Q}$ is 2 Δ from terminal C to terminal Q is 3 Δ. These delays are substantially less than the delays encountered in most of the flip-flop-latches of the prior art; for example, the prior art circuits described in the Italian Patent, filed March 3, 1970.

It is now desirable to consider what occurs when a clock signal is applied or terminated after the circuit of FIG. 2 has reached steady conditions, i.e. when $Q_0 = D$. Where D = 0, so that $Q_0 = 0$, equation (1) provides:

$$\overline{Q}_1 = \overline{0 + 0 + 0} = 1, \text{ unconditionally.}$$

Where D = 1, so that $Q_0 = 1$, equation (1) provides:

$$\overline{Q}_1 = \overline{C + 1 + \overline{C}} = 0\ (2), \text{ unconditionally.}$$

In both instances changes in the C signal do not effect, even momentarily, the output signals. This is due to AND gate 3, which provides a signal independent of the value of C to one input terminal of NOR gate 5. If AND gate 3 were omitted, equation (1) would become:

$$\overline{Q}_1 = \overline{D\,C + \overline{C}\,Q_0}$$

so that equation (2) would become:

$$\overline{Q}_1 = \overline{C + \overline{C}}$$

Thus, even though the final value of $Q_1$ will be a 0, a difference in the propagation time of the change in signal C over the two different paths, only one of which has an inverting element (inverter 1), may result in a spurious transient binary "1" pulse at output terminal $\overline{Q}$. This is because both of the signals C and $\overline{C}$, as received at respective AND gates 4 and 2, may momentarily be at the binary "0" level immediately after the clock signal terminates.

Figure 3:
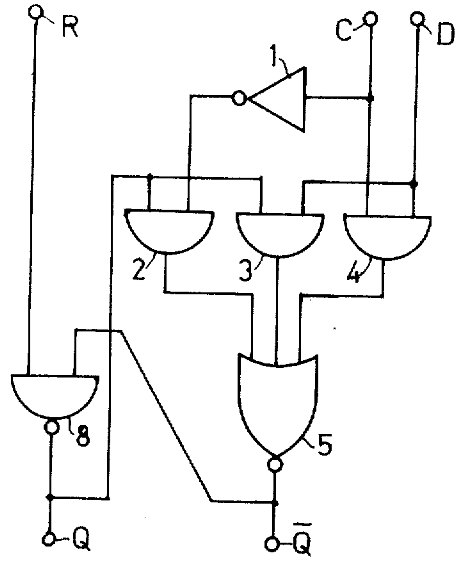
FIGS. 3 and 4 are logical diagrams of variations of the embodiment of FIG. 2.

The logical configuration of the circuit of FIG. 2 does not provide any presetting capability; i.e., a SET or a RESET input terminal to which a signal may be applied to preset the circuit to a predetermined state. FIG. 3 is the logical diagram of a variation of the circuit of FIG. 2 for providing a pre-setting capability. A NAND gate 8 is provided in place of the inverter 6 of FIG. 2. A binary level "1" signal is normally applied to the input terminal R, whereby the operation of the circuit is the same as that of FIG. 2. However, for presetting the signal applied to input terminal R becomes a binary "0," and the output signal Q of NAND gate 8 becomes "1." If the clock signal C is at the level "0," this binary "1" signal Q passes through AND gate 2 to apply a binary "1" to an input terminal of NOR gate 5, forcing its output signal $\overline{Q}$ to be a binary "0." This level at the $\overline{Q}$ terminal maintains the output signal Q at the "1" level even after termination of the presetting signal at input terminal R.

Figure 4:
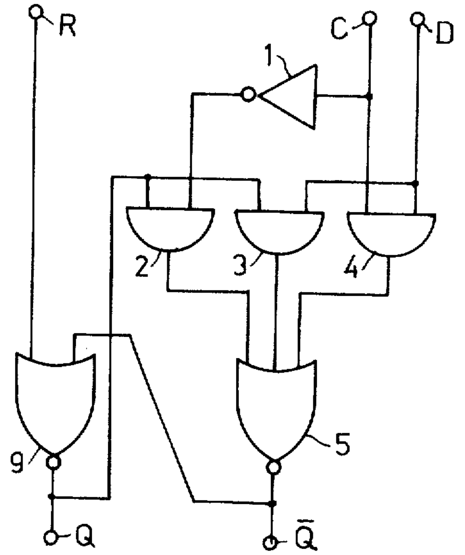

FIG. 4 illustrates another variation of the circuit of FIG. 2 for providing a presetting capability at an input terminal R. A NOR gate 9 is provided in place of the inverter 6 of FIG. 2. Binary level "0" signal is normally applied to input terminal R, whereby the operation of the circuit is the same as that of FIG. 2. For presetting, the signal applied to input terminal R becomes a binary "1," whereby the output signal Q becomes a binary "0" and output signal $\overline{Q}$ becomes a binary "1." This condition is maintained even after termination of the presetting signal at input terminal R.

Figure 5:
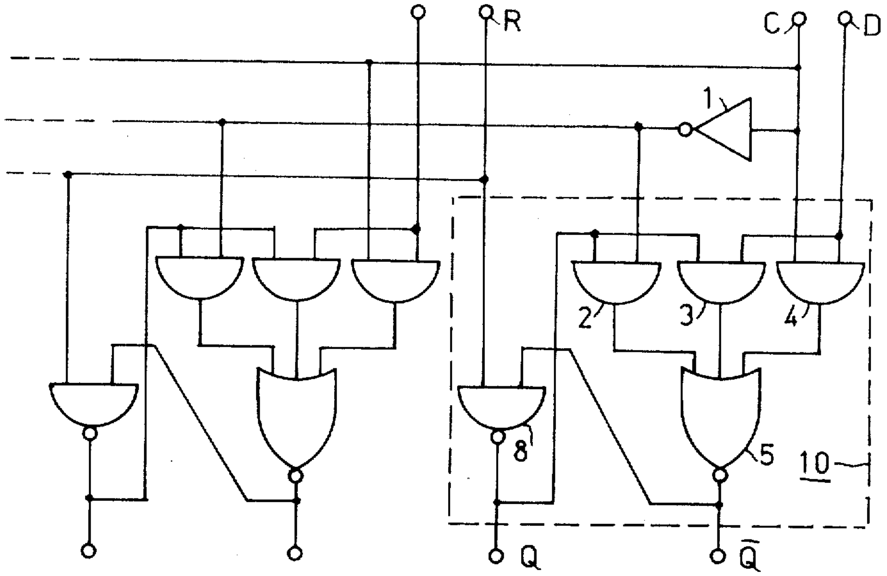
FIG. 5 is a logical diagram of an assemblage of a plurality of bistable circuits of the invention, to form a data register.

FIG. 5 illustrates a register comprising a plurality of bistable circuits of the type shown in FIG. 3. In most registers the various binary digits are entered simultaneously by a single signal clock and presetting occurs simultaneously in all elements by means of a single presetting signal. Accordingly the inverter 1 is made common to a plurality of the bistable circuits and each such bistable circuit is reduced to a single circuit comprising three AND gates 2, 3, and 4, a NOR gate 5, and an element which may be an inverter, a NOR gate or a NAND gate as desired. (in the circuit of FIG. 5, a NAND gate 8 is employed) A data input lead D an optional presetting input lead R and two clock input leads, a direct input lead C and a complementary lead $\overline{C}$, are provided for each bistable circuit. The dashed line rectangles 10 enclose such bistable circuit in the figure. A plurality of such bistable circuits, for example four circuits, together with additional elements such as inverter 1 and other auxiliary circuits, may readily be fabricated by integrated circuit technology on a single semiconductor substrate and enclosed in a single housing. The register may also be assembled from discrete components. In the register structure it is not essential to make the ouput terminal Q physically accessible, since the direct output signals may be derived from the output signals $\overline{Q}$ by inverting elements.

Circuit Implementation

In the preceding, the invention has been described with logical diagrams to emphasize that the performance of a logical device depends primarily on its logical configuration. However, the actual physical fabrication of the flip-flop-latch of the invention may be obtained by various electronic technologies, not being limited to a particular type. Accordingly, various physical embodiments of the invention will now be described. Included, will be embodiments employing discrete components; (diodes, resistors and transistors) which are of the DTL type (Diode-Transistor-Logic), and an embodiment employing integrated circuit technology, which is of the TTL type (Transistor-Transistor-Logic). Nevertheless, it is apparent that by appropriately making necessary circuit changes, a logical configuration may be fabricated by other technologies.

Figure 6:
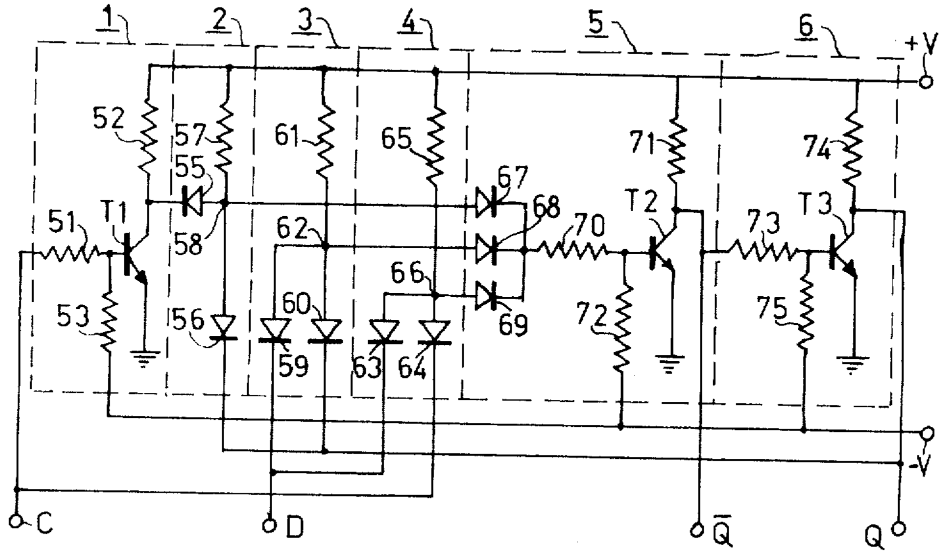
FIG. 6 is a circuit diagram of a bistable circuit according to FIG. 2 which employs discrete components.

FIG. 6 is a circuit diagram of the logical configuration of FIG. 2, fabricated with discrete components. Each logic element is enclosed by dashed lines and identified by the same reference numeral as the corresponding element in FIG. 2.

Inverter 1 comprises a transistor T1 and a collector load resistor 52 connected between the collector of transistor T1 and a suitable positive voltage source V. The emitter of transistor T1 is grounded. A resistor 53 is connected between the base of transistor T1 and a suitable negative voltage source −V. A resistor 51 is connected between the base of transistor T1 and the input terminal C.

When terminal C is at approximately zero voltage, the base-emitter junction of transistor T1 is reverse-biased, whereby the transistor is maintained non-conductive or "off." Since no current flows between collector and emitter, there is no voltage drop across resistor 52, and the collector is at a positive voltage approximately equal +V. When terminal C is a positive voltage, for example +V, the base-emitter junction of transistor T1 is forward-biased, and the transistor is maintained conductive, or "on." Therefore, the collector voltage is approximately at zero voltage.

Therefore, the collector voltage of transistor T1 is the complement of the transistor input voltage and follows variations in such input voltage with a delay dependent on the switching time of of the transistor. The approximate zero voltage level may be employed to represent the binary value "0" and the positive voltage level may be employed to represent the binary value "1." Accordingly the inverter 1 performs the binary inversion function, that the output signal of the inverter is taken from the collector of transistor T1.

Diode 55, diode 56 and resistor 57 which are all connected together at a node 58, perform the logical AND function of AND gate 2. Diode 55 is also connected to the collector of transistor $T_1$ with its permitted direction of conduction from node 58 to such collector. Diode 56 is also connected to the output terminal Q with its permitted direction of conduction from node 58 to terminal Q. Resistor 57 is connected to the source +V.

The node 58 is at the positive voltage level only if the collector of transistor T1 and terminal Q both are at the positive voltage level. Conversely, the voltage of node 58 operates at the lowest of the applied voltages of the collector of transistor T1 and terminal Q when either or both of these applied voltages are not at the positive level.

The operation of the circuit comprising diodes 59 and 60 and resistor 61, which together form AND gate 3, is similar to that described with respect to AND gate 2. Diode 59 is connected between input terminal D and a node 62, with its permitted direction of conduction from the node 62 to terminal D. Diode 60 is connected between output terminal Q and node 62, with its permitted direction of conduction from node 62 to terminal Q. Resistor 61 is connected between node 62 and the source +V.

The operation of the circuit conprising diodes 63 and 64 and resistor 65, which together form AND gate 4, is similar to that described with respect to AND gate 2. Diode 63 is connected between input terminal D and a node 66, with its permitted direction of conduction from node 66 to terminal D. Diode 64 is connected between input terminal C and node 66, with its permitted direction of conduction from node 62 to terminal C. Resistor 65 is connected between node 66 and the source +V.

NOR gate 5 in FIG. 6 comprises diodes 67, 68 and 69, and resistors 70, 71 and 72 and a transistor T2. The cathode of each of diodes 67, 68 and 69 is connected to a first terminal of resistor 70. The second terminal of resistor 70 is connected to the base of transistor T2. The emitter of transistor T2 is grounded. The collector of transistor T2 is supplied from the source +V through resistor 71. Resistor 72 is connected between the base of transistor T2 and source −V.

The anodes of diodes 67, 68 and 69 are connected respectively to nodes 58, 62 and 66, which are the output points of the AND gates 2, 3 and 4.

In operation, if no anode of diodes 67, 68 and 69 receives a positive voltage, the base of transistor T1 is held at an approximately zero voltage, by resistor 72, whereby transistor T2 is maintained off. In this condition the collector of transistor T2, connected to output terminal $\overline{Q}$, is at a voltage approximately equal to +V.

However, if a positive voltage is applied to any one of the anodes of diodes 67, 68 and 69, the base voltage of transmission T2 becomes positive, and the transistor turns on. This brings the voltage of the collector of transistor T2 and, therefore, the voltage of the connected output terminal Q, approximately to zero. Accordingly logical function performed by circuit 5 is the NOR function.

Resistors 73, 74 and 75 and transistor T3 from inverter 6, which is identical to the above described inverter 1. The collector of transistor T3 is connected to the direct output terminal Q. Resistor 73 is connected between the complementary output terminal $\overline{Q}$ and the base of transistor T3.

Figure 7:
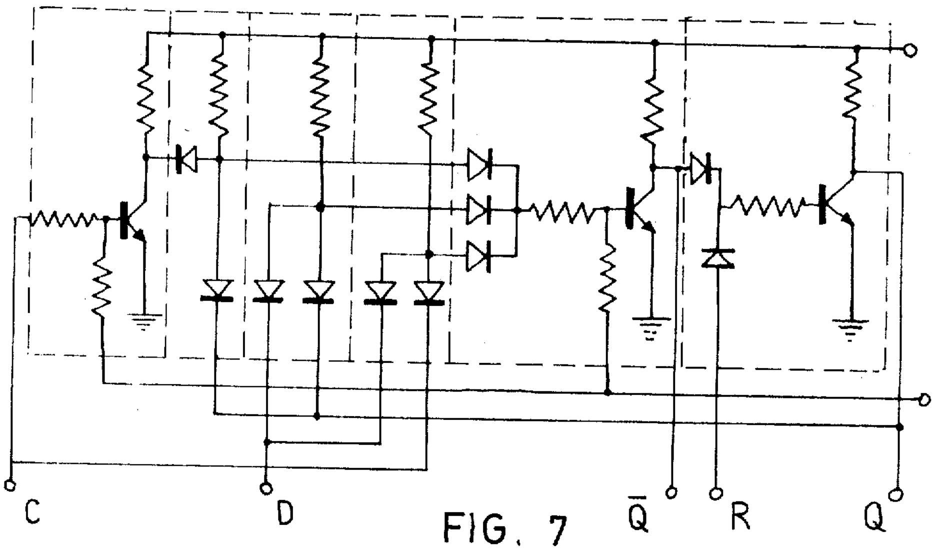
FIG. 7 is a circuit diagram of a bistable circuit according to FIG. 4 which employs discrete components.

FIG. 7 shows the embodiment of the logical configuration of FIG. 4 by the same technology employed for the circuit of FIG. 6. Consonant with the difference between the the circuit of FIG. 2 and that of FIG. 4, the embodiment of FIG. 7 differs from that of FIG. 6 only by the replacement of inverter 6 by an element 9 which performs the logical NOR function. Element 9 is similar to NOR gate 5 and therefore will not be described in detail.

Similarly, the circuit of FIG. 6 may be modified to embody the logic configuration of FIG. 3 by interposing between inverter 6 and NOR gate 5 an AND gate identical to AND gates 2, 3 and 4, thereby providing an element for performing the NAND function.

Figure 8:
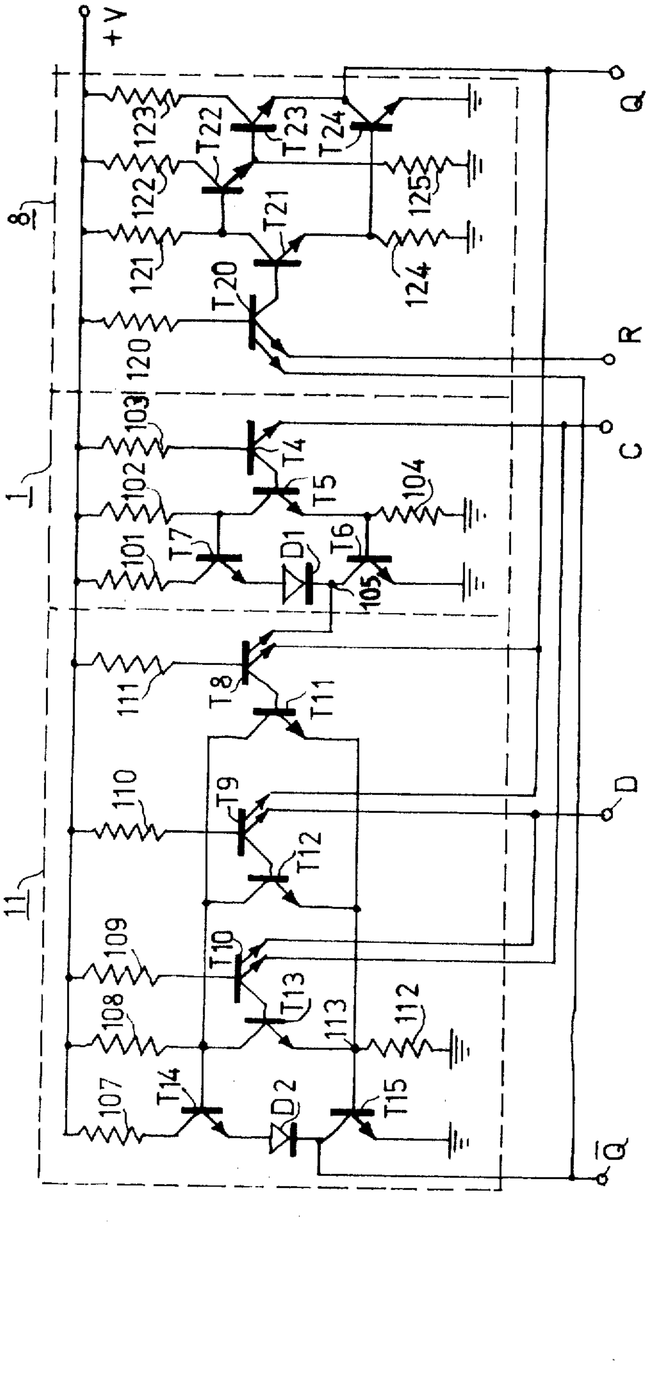
FIG. 8 is a circuit diagram of a bistable circuit according to FIG. 3 which employs integrated circuit technology.

FIG. 8 is a circuit diagram of the bistable circuit of the invention, fabricated by the integrated circuit TTL type of technology. The circuit of FIG. 8 corresponds to the logical configuration of FIG. 3, comprising an inverter 1′ a NAND gate 8′ and an element 11 which performs the AND-OR-NOT function. Element 11 performs all required logical functions provided by gates 2, 3, 4 and 5 of the circuit of FIG. 3.

Inverter 1′ comprises transistors T4, T5, T6 and T7, resistors 101, 102, 103 and 104, and a diode D1. The base of transistor T4 is coupled through resistor 103 to a suitable positive voltage source +V. The emitter of transistor T4 is connected to the clock input terminal C. The collector of transistor T4 is connected to the base of transistor T5. The collector of transistor T5 is coupled through register 102 to the source +V. The emitter of transistor T5 is coupled through resistor 104 to ground. The collector of transistor T5 is directly connected to the base of transistor T6.

Transistors T7 and T6 are series connected, i.e., the collector of transistor T7 is supplied from the source +V through resistor 101, the emitter of transistor T7 is coupled to the collector of transistor T6 through a diode D1, and the emitter of transistor T6 is grounded.

Circuit 1′ performs the inverting function. When an approximately zero voltage is applied to an input terminal C, and thus the emitter of transistor T4, the base-emitter junction thereof is forward biased and transistor T4 is on. Transistor T4 transfers substantially the same zero voltage to the base of transistor T5, which, therefore is off. Consequently the base of transistor T7 is at a voltage approximately equal to +5V, whereas the base of transistor T6 is at ground voltage. Accordingly, transistor T7 is on, and transistor T6 is off. Thus, the node 105, which may be considered to be the output point of inverter 1′, is at a positive voltage approximately equal to +V.

Conversely when a positive voltage is applied to input terminal C, substantially the same voltage is transferred to the base of transistor T5, which therefore is on. The collector voltage of transistor T5 is reducėd from +V by the voltage drop across resistor 102, and the emitter voltage of transistor T5 is increased from ground by the voltage drop across resistor 104. Accordingly, transistor T6 is on, transistor T7 is off, and node 105 is at an approximately zero voltage.

Element 11, which performs the logical AND-OR-NOT function, comprises multiemitter transistors T8, T9 and T10, transistors T11, T12 and T13, output transistors T14 and T15, a diode D2, and resistors 107, 108, 109, 110, 111 and 112.

The two emitters of transistor T8 are connected respectively to the output lead of inverter 1′ and to output terminal Q. The base of transistor T8 is positively biased by resistor 111, which is connected between such base and the voltage source +V. Accordingly, the voltage of the collector of transistor T8 follows the lower potential applied to the two emitters thereof, whereby transistor T8 performs the AND function on the Q signal and the $\overline{C}$ output signal of inverter 1′.

The multiemitter transistors T9 and T10 operate similarly. The emitters of transistor T9 are connected respectively to output terminal Q and to input terminal D, whereby transistor T9 performs the AND function on the Q signal and the D signal. The emitters of transistor T10 are connected respectively to input terminal D and input terminal C, whereby transistor T10 performs the AND function on the D signal and the C signal.

The collectors of transistors T8, T9 and T10 are connected respectively to the bases of transistors T11, T12 and T13. The emitters of transistors T11, T12 and T13 are directly connected together at a node 113, which node is connected through resistor T12 to ground. The collectors of transistors T11, T12 and T13 are also directly connected together and are connected through resistor 108, to the positive voltage source +V.

When any one of the potential applied to the bases of transistors T11, T12 and T13 becomes positive, the corresponding transistor goes on and anode T13 increases from ground potential to a substantially positive voltage, which voltage is, however, appreciably lower than the voltage +V. This positive voltage is applied to the base of transistor T15, which goes on. At the same time the base of transistor T14 drops in voltage and transistor T14 goes off. Consequently, output terminal $\overline{Q}$ acquires a substantially zero voltage. Therefore, it is apparent that element 11 performs the NOR function on the three AND functions of signal C and signal D, of signal D and signal Q, and of signal Q and the output signal of inverter 1′ which represents $\overline{C}$.

The circuit element 8 which performs the logical NAND function, comprises a multiemitter transistor T20, transistors T21, T22, T23 and T24, and resistors 120, 121, 122, 123, 124 and 125. The emitters of transistor T20 are connected respectively to output terminal $\overline{Q}$ and to pre-setting terminal R. The base transistor T20 is positively biased by resistor 120, which is connected between such base and the voltage source +V. The collector of transistor T20 is connected to the base of transistor T21.

Since the presetting terminal R is normally at a positive voltage approximately equal to +V, the collector of transistor T20 follows the changes in potential of terminal $\overline{Q}$. Therefore, transistor T20 performs the AND function on the R signal and the $\overline{Q}$ signal.

The remaining portion of circuit element 8 performs the inversion function. When the base of transistor T21 is at a positive voltage approximately equal to +V, transistor T21 is on, whereupon the collector of transistor T21, due to the voltage drop across resistor 121, is to a voltage appreciably lower than +V and maintains transistor T22 off. The emitter of transistor T22, which is connected through resistor 125 to ground, is at zero potential and holds transistor T23 off. However, since the base of transistor T24 is connected to the emitter of transistor T21, which is on, the base-emitter junction of transistor T24 is forward-biased and therefore transistor T24 is on. Accordingly, the collector of transistor T24, which is connected to output terminal Q, is at zero voltage.

The opposite conditions prevail in element 8 when terminal $\overline{Q}$ is at zero voltage, so that output terminal Q acquires a positive voltage. The same conditions prevail when a zero voltage is applied to presetting terminal R. Accordingly, element 8 performs the required NAND function on signals $\overline{Q}$ and R.

It is apparent that the examples described herein are only a few of the possible embodiments of a logical configuration conforming to the teachings of the present invention, and that other embodiments may be adapted without departing from the spirit and scope of the invention. Thus, the inverter 1' of FIG. 8 has been designed according to a standard integrated circuit type known as TTL I (a medium-speed Transistor-Transistor-Logic), whereas NAND gate 8 of the same figure applies the standard integrated circuit type known as TTL II (A high-speed Transistor-Transistor-Logic), emphasizing the fact that different embodiments may be used for the aforementioned logical configurations.

I claim:

1. A bistable electronic circuit of the flip-flop latch type comprising, in combination: a data input terminal for supplying a data signal, a first clock input point for supplying a clock signal, a second clock input point for supplying an inverted clock signal, at least one data output terminal for delivering data in inverted logical sense, first, second and third circuit elements for performing the logical AND function, each of said circuit elements having at least two input terminals and an output terminal; a fourth circuit element for performing the logical NOR function, said fourth circuit element having three input terminals and one output terminal, a fifth circuit element for performing a logical inversion, said fifth circuit element having at least one input terminal and one output terminal, the two input terminals of said first circuit element being connected respectively to said data input terminal and to said first clock input point, the two input terminals of said second circuit element being connected respectively to the second clock input point and to the output terminal of said fifth circuit element, the two input terminals of said third circuit element being connected respectively to said data input terminal and to the output terminal of said fifth circuit element, the output terminals of said first, second and third circuit elements being connected respectively to one of the input terminals of said fourth circuit element, and the output terminal of said fourth circuit element being connected to said data output terminal and being directly connected to a first input terminal of said fifth circuit element for controlling the state of said fifth circuit element in substantially direct response to operation of said fourth circuit element independently of the data signal.

2. The bistable electronic circuit of claim 1 wherein said fifth circuit element includes additional apparatus for performing the logical NOR function and is provided with a second input terminal, and wherein said bistable electronic circuit further comprises a presetting input terminal connected to said second input terminal of said fifth element.

3. The bistable electronic circuit of claim 2 wherein said electronic circuit is fabricated according to integrated circuit technology, said fabrication causing an inverting operation to occupy a time interval less than Δ and a non-inverting operation to occupy a time interval negligible compared to Δ, a signal on said data output terminal responding to said data signal within a time interval 2 Δ when said clock signal is applied to said first clock input point.

4. The bistable electronic circuit of claim 1 wherein said fifth element includes additional apparatus for performing the logical NAND function and is provided with a second input terminal and wherein said bistable electronic circuit further comprises a presetting input terminal connected to said second input terminal of said fifth element.

5. A bistable electronic circuit of the flip-flop latch type comprising, in combination: a data input terminal for supplying a data signal, a clock input terminal for supplying a clock signal, at least one data output terminal for delivering inverted data in inverted logical sense, first, second and third circuit elements for performing the logical AND function, each of said circuit elements having at least two input terminals and one output terminal, a fourth circuit element for performing the logical NOR function and having at least three input terminals and one output terminal, a fifth circuit element for performing a logical inversion and having at least one input terminal and one output terminal, a sixth circuit element for performing the logical inversion function and having one input terminal and one output terminal, the input terminal of said sixth circuit element being connected to said clock input terminal, the two input terminals of said first circuit element being connected respectively to said data input terminal and to said clock input terminal, the two input terminals of said second circuit element being connected respectively to the output terminal of said sixth circuit element and to the output terminal of said fifth circuit element, the two input terminals of said third circuit element being connected respectively to said data input terminal and to the output terminal of said fifth circuit element, the output terminals of said first, second and third circuit elements being connected respectively to one of the input terminals of said fourth circuit element and the output terminal of said fourth circuit element being connected to said data output terminal and being directly connected to a first input terminal of said fifth circuit element for controlling the state of said fifth circuit element in substantially direct response to operation of said fourth circuit element independently of the data signal.

6. The bistable electronic circuit of claim 5, wherein said fifth circuit element includes additional apparatus for performing the logical NOR function and is provided with a second input terminal and wherein said bistable electronic circuit further comprises a presetting input terminal connected to said second input terminal of said fifth circuit element.

7. The bistable electronic circuit of claim 6, wherein said circuit is manufactured according to integrated circuit techniques, wherein said techniques cause an inverting operation to occupy a time interval less than Δ and a non-inverting operation to occupy a time interval negligible compared to Δ, said data signal resulting in said inverted data in a time interval less than 2Δ when said clock signal is applied.

8. The bistable electronic circuit of claim 5 wherein said fifth circuit element includes additional apparatus for performing the logical NAND function and is provided with a second input terminal, and wherein said bistable electronic circuit further comprises a presetting input terminal connected to said second input terminal of said fifth circuit element.

9. A bistable logical configuration for receiving a clock signal and a data signal operative in one of two levels and for storing a representation of said data signal when said clock signal has a predetermined value, comprising: first, second and third AND gates, each of said AND gates receiving a pair of input signals at respective input terminals thereof and delivering an output signal representing the AND operation on the two signals received thereby at an output terminal thereof, a NOR gate receiving three input signals at respective input terminals thereof and delivering an output signal representing the NOR operation on the three signals received thereby at an output terminal thereof, an inverter receiving an input signal at an input terminal thereof and delivering an output signal representing the logical inversion of the signal received thereby, means coupling the output terminals of said first, second and third AND gates to respective input terminals of said NOR gate, means for directly connecting the output terminal of said NOR gate to the input terminal of said inverter for controlling the operation of said inverter in substantially direct response to operation of said NOR gate independently of said data signal, means for applying said clock signal to one input terminal of said first AND gate, means for applying a logical inversion of said clock signal to one input terminal of said second AND gate, means for applying said data signal to the other input terminal of said first AND gate and to the input terminal of said third AND gate, and means for applying the output signal of said inverter to the other input terminal of said second and third AND gates.

10. A bistable logical configuration for receiving a clock signal operative in one of two levels and designated by the binary variable C and a data signal operative in one of two levels and designated by the binary variable D, wherein said logical configuration stores a representation of said data signal when said clock signal is at a predetermined level, comprising: first, second and third logical elements each receiving a pair of input signals and delivering an output signal representing the AND operation on the two signals received thereby, a fourth logical element for receiving three input signals and for delivering an output signal designated by the binary variable Q, a fifth logical element for performing a logic inversion, said fifth logical element having at least one input terminal and at least one output terminal for supplying a complementary output signal designated by the binary variable $\bar{Q}$, means for applying said clock signal to said first logical element, means for applying said data signal to said first and second logical element, means for applying a logical inversion of said clock signal to said third logical element, means for applying said output signal of the fourth logical element to said second and third logical elements, means for applying said output signals of the first, second, and third logical element to said fourth logical element, and means for directly applying said output signal of said fourth logical element to the input terminal of said fifth circuit element independently of said data signal, wherein said fifth logical element comprises a logical configuration for delivering a complementary output signal which represents the $$\overline{C.D + Q.D + Q.\bar{C}}$$

logical operation on the signals received thereby.

11. The bistable logical configuration of claim 10 wherein said configuration is fabricated by integrated circuit technology, an inverting operation occupying a time interval less than Δ and a non-inverting operation occupying a time interval negligible compared to Δ, said Q and said Q responding to a data signal within a time 2Δ when said clock signal is at said predetermined level.

12. A bistable logical configuration for receiving a clock signal and a data signal operative in one of two levels and for storing a representation of said data signal when said clock signal has a predetermined value, said logical configuration fabricated according to a technique wherein an inverting operation occupies a delay time less than Δ and a non-inverting operation occupies a delay time negligible compared to Δ, comprising: first, second and third AND gates, each of said AND gates receiving a pair of input signals at respective input terminals thereof and delivering an output signal representing the AND operation on the two signals received thereby at an output terminal thereof, a NOR gate receiving three input signals at respective input terminals thereof and delivering an output signal representing the NOR operation on the three signals received thereby at an output terminal thereof, an inverter receiving an input signal at an input terminal thereof and delivering an output signal representing the logical inversion of the signal received thereby, means coupling the output terminals of said first, second and third AND gates to respective input terminals of said NOR gate, means for directly connecting the output terminal of said NOR gate to the input terminal of said inverter for controlling the operation of said inverter in substantially direct response to operation of said NOR gate independently of the data signal, means for applying said clock signal to one input terminal of said first AND gate, means for applying a logical inversion of said clock signal to one input terminal of said second AND gate, means for applying said data signal to the other input terminal of said first AND gate and to the input terminal of said third AND gate, and means for applying the output signal of said inverter to the other input terminal of said second and third AND gates, said output signal of said inverter and an output signal of said NOR gate responding to said data signal within a delay time of 2Δ when said clock signal has said predetermined value.

* * * * *